J. N. FARRAR.
Improvement in Elastic-Packing for Car-Wheels.
No. 130,118.                                 Patented Aug. 6, 1872.
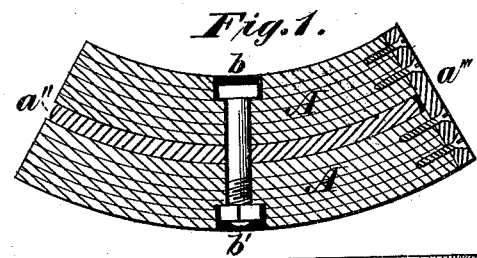
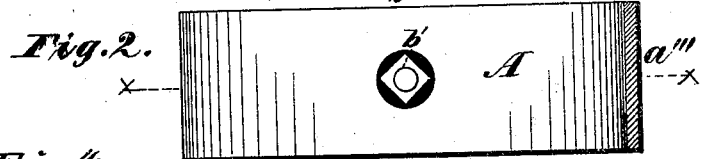
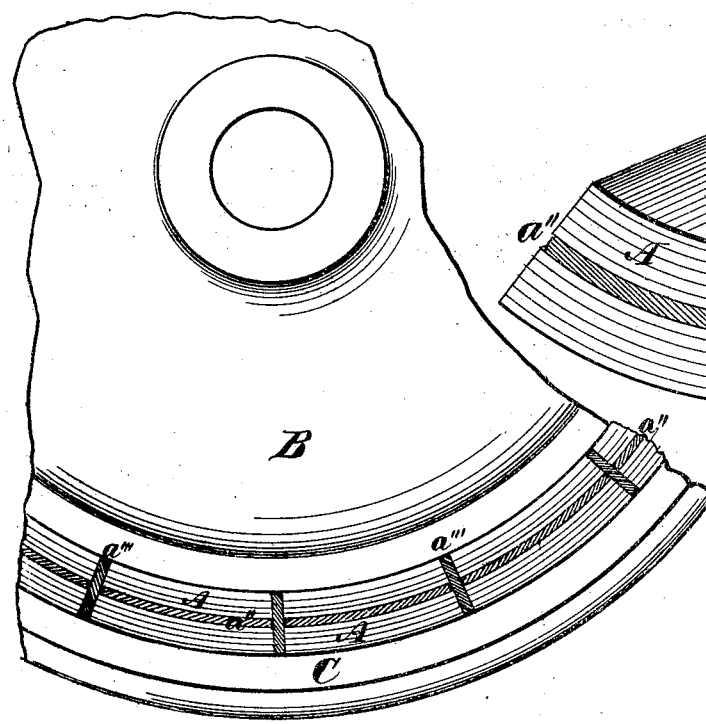
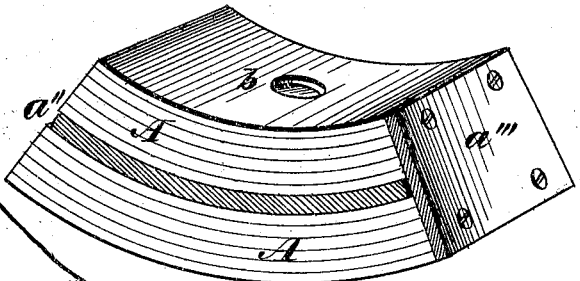
Witnesses:                                   Inventor:

UNITED STATES PATENT OFFICE.

JOHN N. FARRAR, OF TRUMANSBURG, NEW YORK.

IMPROVEMENT IN ELASTIC PACKINGS FOR CAR-WHEELS.

Specification forming part of Letters Patent No. 130,118, dated August 6, 1872.

*To all whom it may concern:*

Be it known that I, JOHN N. FARRAR, of the town of Trumansburg, in the county of Tompkins, State of New York, have invented a new and useful Improvement in Elastic Packing for Wheels; and I do hereby declare that the following is a full and clear description thereof, which will enable others skilled in the art to make and use the same, reference being had to the accompanying drawing.

Similar letters of reference indicate corresponding parts.

My invention has for its object to furnish an improved packing for elastic carriage and car wheels, composed of rubber and paper.

Figure 1 represents a section taken through $x \, x$ of Fig. 2 of one of the blocks of elastic packing. Fig. 2 represents a top view of a block of packing, showing the tread or tire-face. Fig. 3 represents perspective view of the same. Fig. 4 represents a side view of a portion of a car-wheel, showing the position and arrangement of the improved packing.

Letters denote parts as follows: A, blocks of paper; $a''$, rubber; $b$, bolt-head recess in the paper; $b'$, bolt to confine different parts of the packing together. B represents the body of the wheel, and C the tire portion of the wheel. The packing is formed by interposing rubber $a''$ between two or more blocks of paper A, the object of which is to add any desired elasticity required to the paper, which alone is too inelastic. These various parts are firmly secured together by a short bolt, $b'$, with head and nut so sunk in a recess, $b$, in the blocks of paper as to give ample room for elastic play to the packing without coming in contact with the main wheel and tire. The rubber on the ends of the compound packing-blocks, Fig. 3, $a'''$, allows contraction of the blocks, Fig. 3, when the tire is forced on over them, which prevents looseness of any parts of the wheel.

This packing, composed of blocks of paper and rubber, is interposed between the tire and hub portions of a metallic wheel similar to a representation in Fig. 4, and may used in any wheel suitably constructed to receive it, several of which are patented.

I do not claim the use of paper or rubber singly or separately in wheels; but

What I do claim as new, and desire to secure by Letters Patent, is—

1. Constructing a combination elastic packing by interposing rubber between two or more blocks of paper, substantially as and for the purpose specified.

2. Interposing rubber between the ends of blocks of packing, as shown in Fig. 4, $a'''$, for the object set forth.

3. The combination of blocks of paper A, rubbers $a''$ $a'''$, bolt $b'$, substantially as described.

In testimony whereof I have signed my name to this specification in the presence of two subscribing witnesses.

JOHN N. FARRAR.

Witnesses:
CHAS. BUTTRICK,
FRANCIS A. BUTTRICK.